Sept. 24, 1946. G. Y. EATON 2,408,162
SPECTACLE AND EYEGLASS RECEPTACLE
Filed April 3, 1944
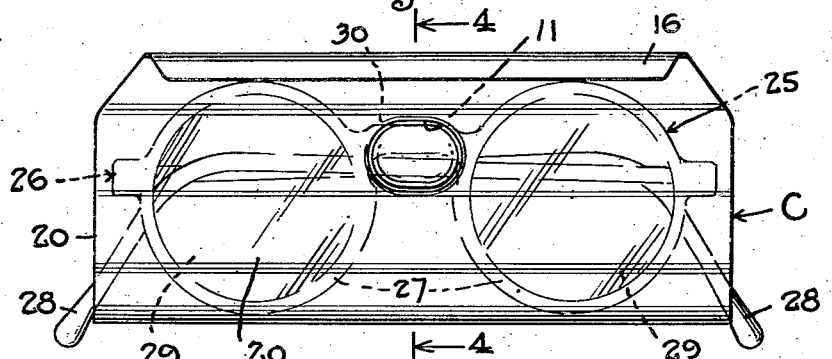
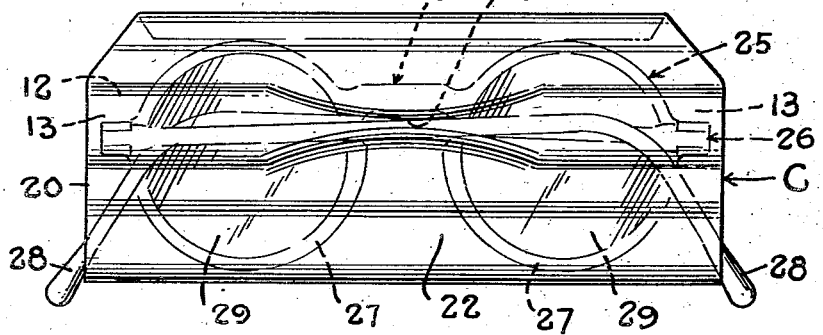
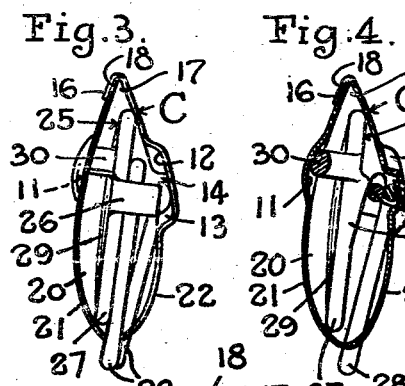
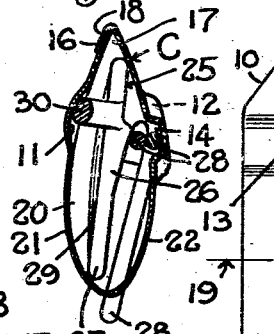
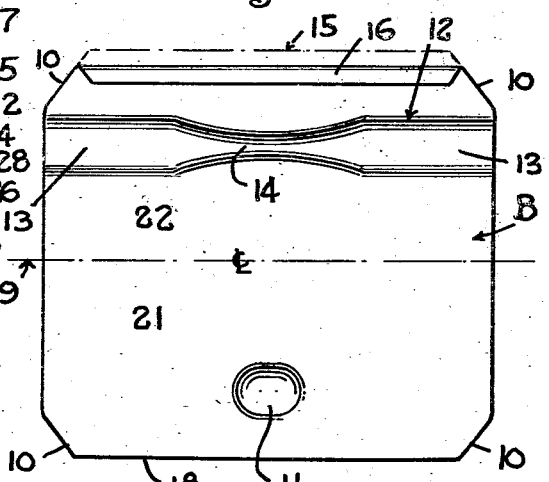
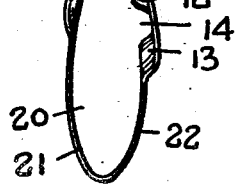
INVENTOR.
GREGORY Y. EATON
BY
Frederick Diehl
ATTORNEY Patented Sept. 24, 1946

2,408,162

UNITED STATES PATENT OFFICE 2,408,162

SPECTACLE AND EYEGLASS RECEPTACLE

Gregory Y. Eaton, Pasadena, Calif., assignor to Technical Surfaces Ltd., Los Angeles, Calif., a limited partnership composed of Howard G. Hoffer and Chester L. Chalberg Application April 3, 1944, Serial No. 529,280

3 Claims. (Cl. 206—5)

This invention relates generally to spectacles and eyeglasses, and more particularly to cases or covers therefor to protect same when not in use.

An object of the invention is to provide a spectacle and eyeglass receptacle which is structurally characterized to render maximum protection to such articles against damage or breaking of the lenses in the event that the receptacle should be dropped, struck, or subjected to pressure; which effectively holds spectacles and eyeglasses of different sizes and constructions; which is of sanitary construction enabling it to be thoroughly washed or otherwise cleaned with ease and dispatch; and which remains remarkably free of dust and other foreign substances having a tendency to collect in spectacle cases of various constructions heretofore proposed.

Another object of this invention is to provide a case for spectacles and eyeglasses which is simply and cheaply constructed from a sheet of flexible, durable, sanitary and attractive material formed into a flattened, open-ended tube which is maintained in tube formation without any extraneous fastening means, and flexes or yields sufficiently to permit insertion of the spectacles from one end or the other of the tube, for operation of retaining means of the tube, while thus flexed, in producing adequate holding action upon the spectacle frame to prevent displacement of the spectacles, all while supporting the lenses of the spectacles free of contact with the case so as to afford maximum protection to the lenses against being damaged or broken should the case be dropped, struck or otherwise roughly handled.

With these and other objects in view, the invention resides in the combinations, arrangements and functional relationships of elements as set forth in the following specification and particularly pointed out in the appended claims.

In the accompanying drawing:

Figure 1 is a view showing in front elevation, one form of spectacle and eyeglass receptacle embodying this invention, with a pair of spectacles therein;

Figure 2 is a view in rear elevation of the receptacle, with a pair of spectacles in place therein;

Figure 3 is a view of the receptacle in end elevation;

Figure 4 is a transverse sectional view taken on the line 4—4 of Figure 1;

Figure 5 is a view similar to Figure 4 and showing the normal position assumed by the receptacle when empty; and Figure 6 is a view showing the blank from which the receptacle is formed.

Referring specifically to the drawing, the invention in its present illustrated embodiment is constructed from a single sheet or blank B (Figure 6) of suitable flexible material such as lightweight metal or plastics, which latter are particularly desirable in certain forms, one of which known as "Tenite" is durable, light in weight, sanitary, flexible, transparent, and comes in many attractive colors.

The blank B is generally rectangular in outline and is beveled or rounded as indicated at 10 to remove its otherwise sharp corners. In utilizing the blank B to construct the spectacle and eyeglass case designated generally at C in the remaining figures, the blank is preformed with a generally oval shaped cavity 11 and with a recess 12 extending from one side of the blank to the other and having relatively wide end portions 13 merging into a relatively narrow or restricted medial portion 14, all for a purpose to be later described.

Along one side edge 15, the blank is bent back upon itself to provide a retaining flange or lip 16 defining a groove 17 adapted to receive the opposite side edge 18 when the blank is flexed upon itself along the general center line 19 so as to form a flattened open-ended tube 20 whose walls 21 and 22 are curved outwardly from each other. The aforesaid cavity 11 is located in the blank B to appear in the inner side of the wall 21 medially between its ends, whereas the recess 12 is located in the blank to appear in the inner side of the wall 22 parallel to and co-extensive in length with the tube.

Under the natural resiliency of the material in tending to spread the walls 21 and 22 at their free edges, the flange 16 co-acts with the edge portion 18 to releasably retain the blank in its flattened tubular form with such security as to obviate the need for any extraneous fastening means.

The completed receptacle C as above described has a length from one open end to the other, slightly exceeding the width of the frame 25 of a pair of spectacles 26 from side to side at a point adjacent the hinges where the bows join the rims, and has an inside width to freely receive rims 27 of the largest diameter generally met with in practice. The inside thickness of the receptacle C as shown in Figure 5 is slightly less than that required to receive the spectacles when the bows 28 thereof are folded upon each other across the frame 25, so that it becomes necessary to force the folded spectacles into one or the other open end of the tube 20, thus slightly expanding same in opposition to the retaining action of the flange 16, with the result that the walls 21 and 22 exert lateral pressure upon the frame while leaving the lenses 29 entirely clear of the case.

With the spectacles inserted into the receptacle, the nose piece or bridge 30 of the spectacles seats in the cavity 11 so as to center the spectacles in the case, whereas the bows 28 are firmly confined at their point of crossing in the restricted medial portion 14 of the recess 12, all for coaction with the aforestated pressure exerted by the walls 21 and 22 against the spectacle frame 25, in securely holding the spectacles against displacement from the case, yet permitting the spectacles to be easily withdrawn from one or the other end of the case.

It will be noted that the widened portions 13 of the recess 12 accommodate the bows 28 irrespective of the height at which they are fastened to the rims 27, so that the bows will freely enter the recess from one end or the other and will guide the crossed portion of the bows into the restricted medial part 14 of the recess.

From the foregoing description it will be manifest that the receptacle C is sufficiently rigid to adequately protect the spectacles and prevent damage to the freely suspended lenses thereof should the receptacle be dropped or subjected to various shocks, all while frictionally maintaining the spectacles securely against displacement from the case, yet enabling the spectacles to be easily inserted into one end or the other of the case and as easily withdrawn therefrom.

I claim:

1. A spectacle case in the form of a flattened tube open at both ends and adapted to slidably receive a pair of spectacles with crossed bows from either end, said case being made from a single blank of relatively stiff but resilient sheet material, said blank being folded and its longitudinal edges connected along the top longitudinal edge of the case to form side walls capable of being resiliently urged apart when a pair of spectacles is inserted through either open end of the case; a shallow recess formed in the inner surface of one wall intermediate its ends and closer to said top longitudinal edge than to the opposing edge; a channel formed in the inner surface of the other wall and extending from end to end of the case, said channel paralleling the top edge and spaced therefrom a greater distance than the shallow recess, said shallow recess and channel providing surfaces to be sprung apart by the nose piece and crossed bows of a pair of spectacles inserted in the case whereby the walls of the case are flexed outwardly out of contact with the lenses of such spectacles and such spectacles are removably retained in such case by the resiliency of the walls and cooperation between the nose piece and the shallow recess.

2. A spectacle case in the form of a flattened tube open at both ends and adapted to slidably receive a pair of spectacles with crossed bows from either end, said case being made from a single blank of relatively stiff but resilient sheet material, said blank being folded and its longitudinal edges connected along the top longitudinal edge of the case to form side walls capable of being resiliently urged apart when a pair of spectacles is inserted through either open end of the case, said side walls diverging from such longitudinal edge and joining in a longitudinal bottom edge of the case, said case having a length exceeding the breadth of a spectacle frame between the outside edges of rims of such frame; a shallow recess formed in the inner surface of one wall intermediate its ends and closer to said top longitudinal edge than to the opposing edge; a channel formed in the inner surface of the other wall and extending from end to end of the case, said channel paralleling the top edge and spaced therefrom a greater distance than the shallow recess, said shallow recess and channel providing surfaces to be sprung apart by the nose piece and crossed bows of a pair of spectacles inserted in the case whereby the walls of the case are flexed outwardly out of contact with the lenses of such spectacles and such spectacles are removably retained in such case by the resiliency of the walls and cooperation between the nose piece and the shallow recess.

3. A spectacle case in the form of a flattened tube open at both ends and adapted to slidably receive a pair of spectacles with crossed bows from either end, said case being made from a single blank of relatively stiff but resilient sheet material, said blank being folded and its longitudinal edges connected along the top longitudinal edge of the case to form side walls capable of being resiliently urged apart when a pair of spectacles is inserted through either open end of the case; a shallow recess formed in the inner surface of one wall intermediate its ends and closer to said top longitudinal edge than to the opposing edge; a channel formed in the inner surface of the other wall and extending from end to end of the case, said channel paralleling the top edge and spaced therefrom a greater distance than the shallow recess, said channel being narrower in its medial portion than at the ends and of a width adapted to confine crossed portions of bows of a pair of spectacles inserted in the case, said shallow recess and channel providing surfaces to be sprung apart by the nose piece and crossed bows of a pair of spectacles inserted in the case whereby the walls of the case are flexed outwardly out of contact with the lenses of such spectacles and such spectacles are removably retained in such case by the resiliency of the walls and cooperation between the nose piece and the shallow recess.

GREGORY Y. EATON.